(No Model.) 4 Sheets—Sheet 1.
W. C. FREEMAN.
MACHINE FOR MAKING POTATO MASHERS.
No. 427,981. Patented May 13, 1890.
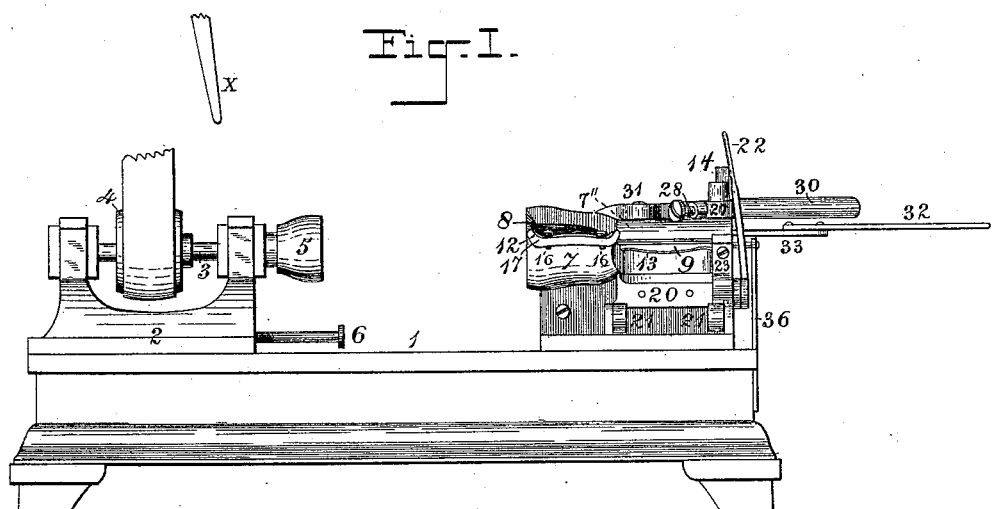
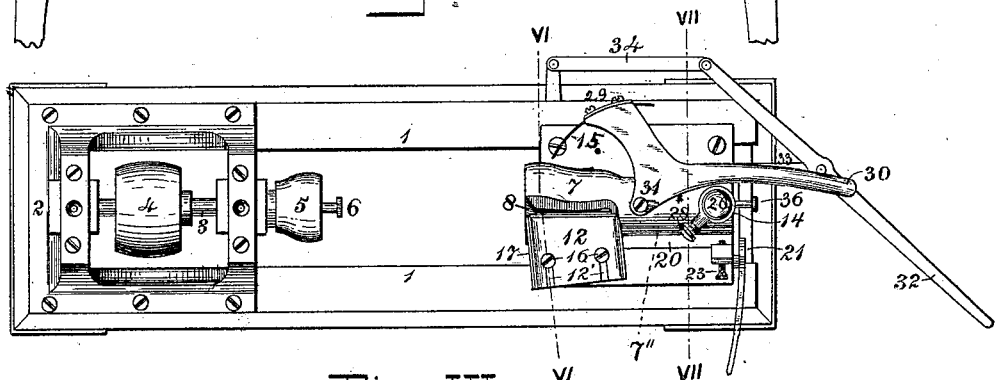
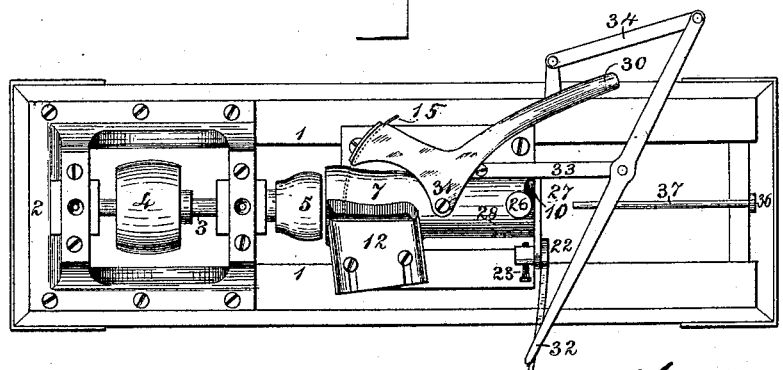
Witnesses
Lillie Hanna
Mazie V. Bidgood
Inventor
William C. Freeman
By Knight Bros.
Attys.

(No Model.) 4 Sheets—Sheet 2.
W. C. FREEMAN.
MACHINE FOR MAKING POTATO MASHERS.
No. 427,981. Patented May 13, 1890.
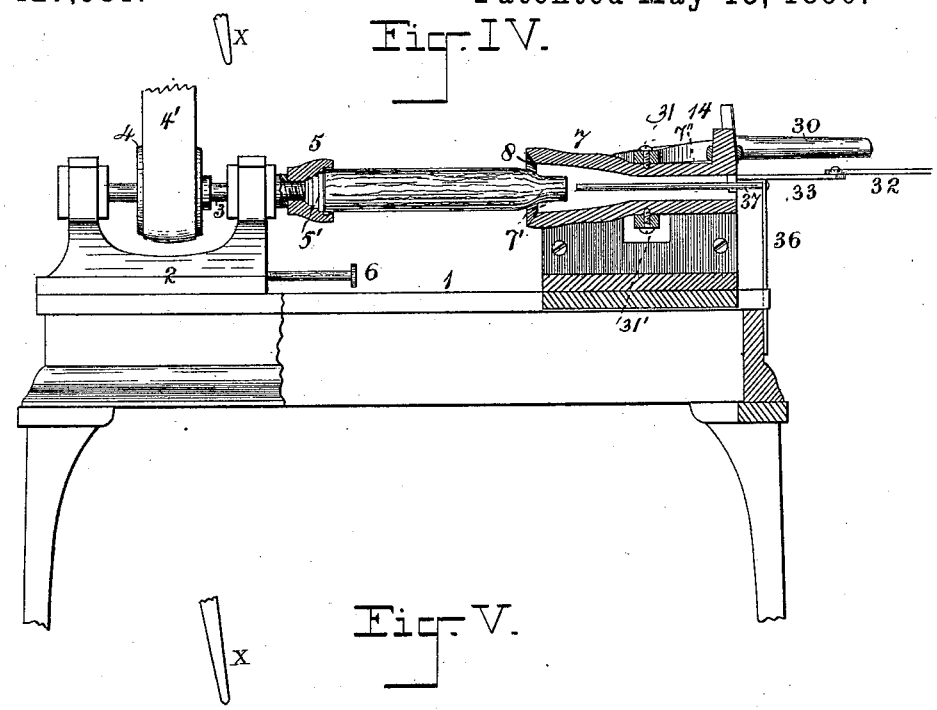
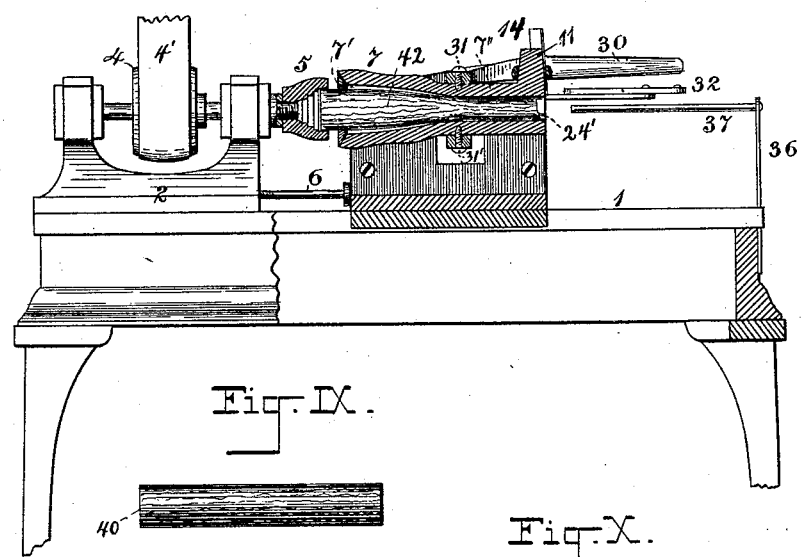
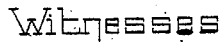
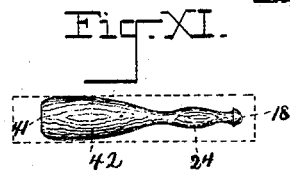
Witnesses
Lillie Hanna
M. V. Bidgood
Inventor
William C. Freeman
By Knight Bros.
Attys
THE NORRIS PETERS CO., PHOTO-LITHO., WASHINGTON, D. C.

(No Model.) 4 Sheets—Sheet 3.
W. C. FREEMAN.
MACHINE FOR MAKING POTATO MASHERS.
No. 427,981. Patented May 13, 1890.
Fig. VI.
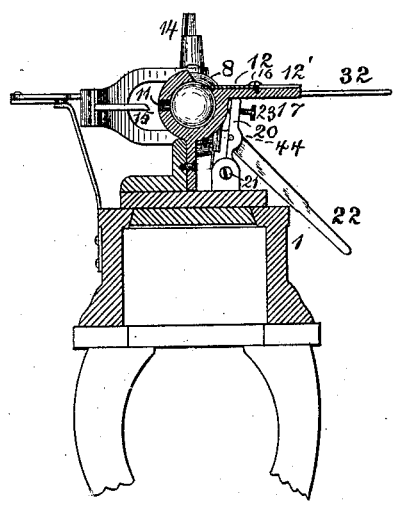
Fig. VII.
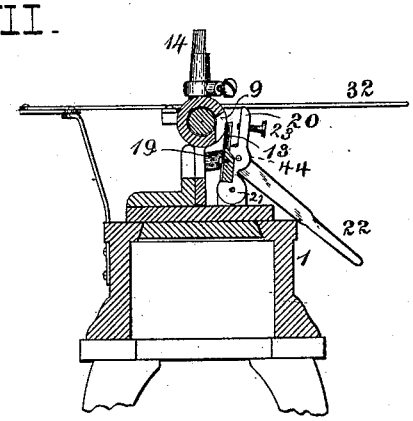
Fig. XII.
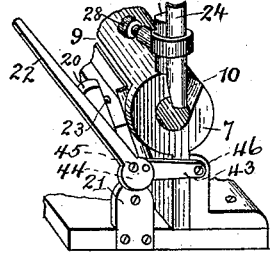
Fig. VIII.
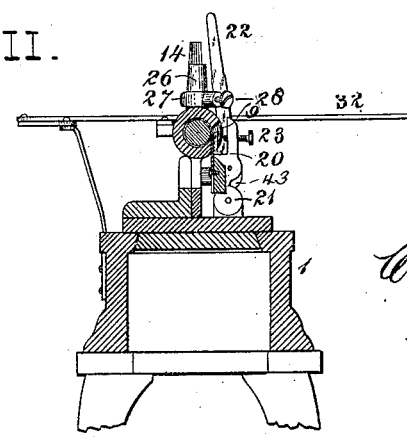
Witnesses
Lillie Hanna
Mazie V. Bidgood
Inventor
William C. Freeman
By Knight Bros.
Att'ys (No Model.) 4 Sheets—Sheet 4.
W. C. FREEMAN.
MACHINE FOR MAKING POTATO MASHERS.
No. 427,981. Patented May 13, 1890.
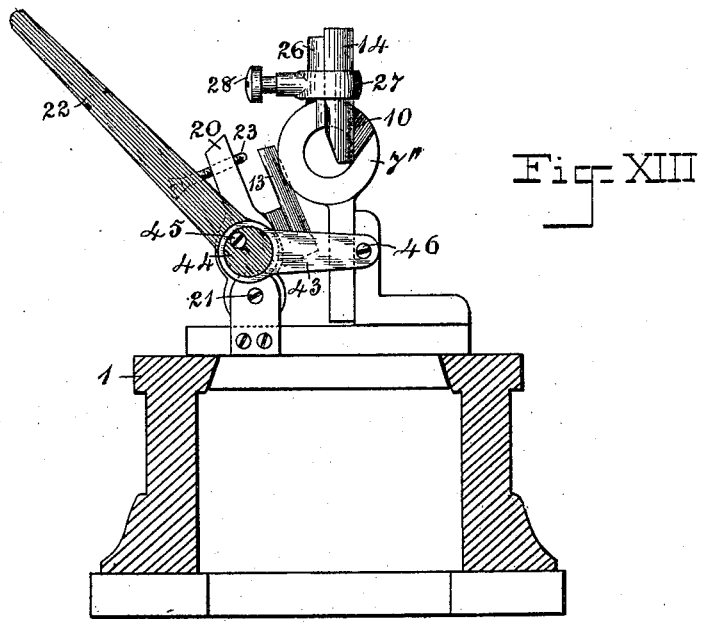
Fig. XIII
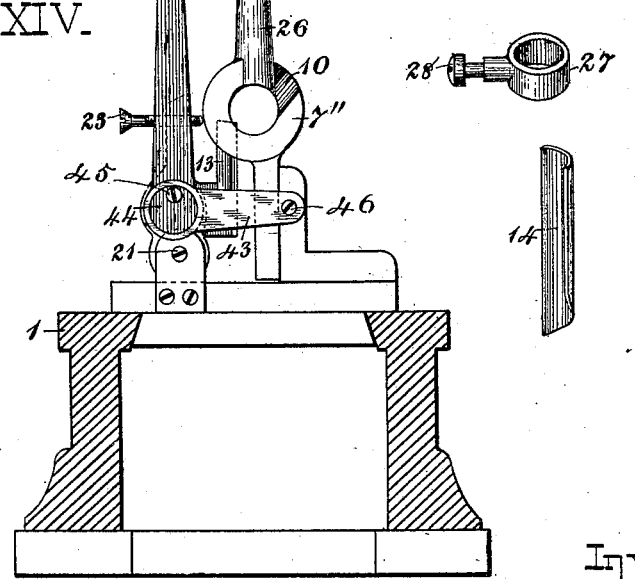
Fig. XIV.
Witnesses
Lillie Hanna
Mazie V. Bidgood
Inventor
William C. Freeman
By Knight Bros.
Attorneys

UNITED STATES PATENT OFFICE.

WILLIAM C. FREEMAN, OF LOUISIANA, MISSOURI.

MACHINE FOR MAKING POTATO-MASHERS.

SPECIFICATION forming part of Letters Patent No. 427,981, dated May 13, 1890.

Application filed November 12, 1889. Serial No. 330,024. (No model.)

*To all whom it may concern:*

Be it known that I, WILLIAM C. FREEMAN, a citizen of the United States, residing at Louisiana, Pike county, State of Missouri, have invented a new and useful Machine for Making Potato-Mashers, of which the following is a specification.

My invention relates to a device for the manufacture by unskilled labor and in merchantable condition of any number of facsimiles of a given form of potato-masher. In order that each masher may be finished out of hand free from checks and tool-marks, I employ (in conjunction with a tubular and shiftable tool-stock) several adjustable and suitably formed and attached turning and shaping blades or bits, as hereinafter described.

Referring to the accompanying drawings, which form a part of this specification, Figure I is a front elevation of a machine embodying my invention in condition to receive a "blank." Fig. II is a top view of the same. Fig. III is a top view of the machine as it appears at completion of a masher. Fig. IV is a vertical axial section of the sliding tool-stock and the revolving chuck, the blank being shown in position and partially reduced. Fig. V is a similar section taken at a later stage of the operation, the head of the masher (with the exception of its butt-end) being shown formed and the handle in its first stage of formation. Fig. VI is a cross-section of the sliding tool-stock on the line VI VI. Fig. VII is a cross-section of the sliding tool-stock on the line VII VII. Fig. VIII is a section on the line VII VII, showing the handle-shaping blade in the compressed position. Fig. IX represents a blank or billet ready for insertion in the machine. Fig. X shows the form given to the blank by the bit 12. Fig. XI represents a completed potato-masher. Fig. XII represents the tail end of the tool-stock. Fig. XIII is a rear elevation, which shows the handle-shaping bit in its retracted position and the crown-shaping bit clamped to its place on the post. Fig. XIV is a rear elevation showing the handle-shaping bit in its effective position and representing the crown-bit and its fastening-clamp detached.

1 may represent a bed similar to that of an ordinary lathe.

2 may represent a customary lathe head-stock carrying the usual spindle 3, having the accustomed pulley 4 for a driving-belt 4', which extends from a common fast and loose pulley, (not shown,) whose operating-lever is shown at X. Mounted on one end of spindle 3 is a suitable chuck 5, to receive the butt-end of the blank or billet, Fig. IX. This chuck is preferably cup-formed and inscribed interiorly with a right-hand spiral thread 5', to enable it to securely grasp and hold the butt-end 40 of the blank. Projecting from the breast of the head-stock is an adjustable screw-threaded forward stop or gage 6 for limiting approach to the said head-block of a slidable tool-stock 7, which is guided in its approach toward and recession from the head-stock by the said lathe-bed 1. The said tool-stock takes at its upper part a bottle-shaped tubular form, which is arranged in strict axial alignment with the chuck 5, to which its widest opening (which takes the form of a bell-mouth 7', and whose remaining portion is of less diameter and takes the form of a cylindrical neck 7") is presented. This tubular portion constitutes the "rest" or holder for the crown end of the blank or billet. The said slidable tool-stock has four slots or orifices 8 9 10 11 for the respective bits or blades 12 13 14 15, which are necessarily employed to form the body, the handle, the crown, and the butt portions of the masher. The bit 15, besides giving the desired convex finish 41 to the butt-end, by the same act operates to sever the finished masher from the stub-piece. Of these bits, 12 represents the bit which shapes the body of the masher. With this object in view it has the represented double-ogee or curved shape and has two slots 12' for screws 16, by which after proper adjustment it is secured to the external flange 17 of the said tool-stock. These parts are so formed and disposed (see Figs. II and VI) that the cutting-edge of the said bit (as the tool-stock is gradually shifted leftward by the operator) serves to shape and finish the body 42 of the masher. The bit 12 also operates to reduce the handle portion of the masher to the form shown at 24', Figs. V and X.

The bit 13, which shapes the handle of the masher, is curved somewhat similarly to bit 12, and has like screws 19 for adjustable attachment to rocker 20, which is fulcrumed at 21 to the tool-stock and is capable of being thrust toward or drawn away from the work by its link and eccentric connection 43 44 with a lever 22, accessible to the operator, said lever being fulcrumed to the tool-stock at 45 and said link being fulcrumed to the tool-stock at 46. Exact limitation of penetration of the bit 13 may be secured by a gage-screw 23.

The desired rounded or convex finish of the crown 18 is given by the bit 14, which for this purpose has the represented concavo-convex cylindrical form and is capable of being shifted circumferentially forward or backward and perpendicularly to any desired penetration within its slot 10. Having been properly adjusted, it is held fast upon post 26 by screw-clip or ferrule 27 28. This post 26 also serves as the back-stop to limit the retrograde stroke of the lever which holds the bit 15, now to be described.

The convex butt-end of the masher is formed by curved or arcuate bit 15, which in the very act of thus finishing the butt also operates to sever the thus finished masher from its stub-piece. This bit has a chisel-point and is fixed by screws 29 in a bent lever 30, which is fulcrumed, as at 31 31', to the tool-stock on a line which intersects the said tool-stock's axis vertically. The curve of the bit 15 is a circular arc concentric with the fulcrums 31 31', the radial distance from said fulcrums being such as to give the desired degree of rotundity to the finished bit. The arcuate bit 15 thus discharges the two-fold function of shaping the butt-end of the masher, and by the same act severing the completed masher from the stub, and which remains within the cup-formed chuck after the tool-stock, with its contained masher, has been shifted back to its initial position.

Shift of the tool-stock toward or from the head-stock is effected by means of a lever 32, which is connected by a link 33 to the tool-stock and by a link 34 to the lathe-bed.

A post 36 limits the retrograde excursions of the tool-stock and carries a prod or ramrod 37, which operates to expel the finished masher by the simple act of shifting the tool-stock to its initial position upon the lathe-bed.

The operation is as follows: Any number of cylindrical or approximately cylindrical blanks or billets, Fig. IX, being provided of slightly-greater dimensions than the finished masher, Fig. XI, the spindle 3, with its chuck 5, being in motion and the tool-stock being at its initial position, (see Figs. I and II,) the operator grasps a blank with his left hand and inserts it endwise into the open end of the tool-stock, and, holding the projecting end of the blank in the axial position, he, with his right hand upon the lever 32, shifts the tool-stock leftwise along the bed until the exposed end of the blank engages in and is grasped by the still revolving chuck 5. The operator, continuing to press the work toward the head-stock, causes the bit 12 to swiftly pare down the stuff to the intermediate form shown in Figs. V and X. The operator, still holding the tool-rest in position, then with his disengaged hand elevates and presses from him the lever 22, so as to bring bit 13 into action, and thus shape the side 24 of the handle. Near the close of this operation a slight leftwise pressure of the tool-stock against the stop 6, forcing the inner end of the rotating masher in contact with the gouge-formed bit 14, causes said bit to impart the rounded finish to the crown. (Shown at 18 in Fig. XI.) The construction and adjustment of the parts are such that the gage 6 serves to arrest the tool-stock at a place such that the crown-finish of the handle is secured and collision of bit 12 and chuck 5 is prevented. Nothing now remains but to form the convex butt-end, and by the same act to sever the finished masher. This double result is accomplished by the operator pushing from him the lever 30, so as to bury the arcuate bit 15 in the substance of the billet until the above and concluding double purpose is accomplished. The operator has now only to restore the tool-stock to its initial position (causing the prod 37 to expel the finished masher) and remove the stub to make way for another billet.

The shapes, positions, and independent actions of the several bits secure the easy and rapid production of exactly corresponding smooth and shapely merchantable mashers, free from cross-grain checks, splinters, &c., and without requiring any skill or prowess on the part of the operator.

The parts 20 21 43 44 22 are so proportioned as, when the lever 22 is at its most elevated position, to bring the centers of vibration at or near on a right line in direction of the stress, and to thus enable them to sustain the entire stress of the bit and to hold it firmly to its work with but little labor on the part of the operator.

Having thus described my invention, the following is what I claim as new therein and desire to secure by Letters Patent:

1. In a machine for making potato-mashers, the combination, with the revolving chuck 5, of the bottle-formed longitudinally-shiftable tool-stock 7, said tool-stock having the orifices 8 9 10 11 and the consecutively-operated bits 12 13 14 15, arranged, constructed, and operating in the manner set forth—that is to say, a longitudinal slot 8 in the side of the bell-mouth 7', having fixed to its lower lip an adjustable ogee bit 12, a longitudinal slot 9 on the neck 7'' of the tool-stock, an ogee bit 13, vibrated about a fulcrum 21 on and parallel to the axis of said tool-stock, an orifice 10, radial of and at the tail end of said tool-stock, which orifice contains an adjustable gouge-shaped bit 14, and an orifice 11, which receives an arcuate chisel-formed bit 15, vibrated about fulcrums 31 31', which intersect the axis of the tool-stock vertically.

2. In a machine for making potato-mashers, the combination, with the revolving chuck 5, of the longitudinally-shiftable tool-stock 7, having the side orifice 11, and the fulcrums 31 31' (on a line which intersects the tool-stock axis vertically) for bent lever 30, carrying the laterally-vibrated arcuate bit 15 for shaping the convex butt and separating the completed masher, as set forth.

3. In a machine for making potato-mashers, the combination of the bent lever 30, having the fulcrums 31 31', perpendicular to the stock-axis and carrying the curved severing and butt-forming bit 15, as set forth.

4. In a machine for making potato-mashers, the combination of tubular tool-stock 7, whose bore corresponds approximately in shape with the external form of the desired masher and has a side orifice 11 for the traverse of the curved butt forming and severing bit 15, concentric with fulcrums 31 31', perpendicular to the stock-axis, as set forth.

5. In a machine for making potato-mashers, the combination of the lever 22, the link 43, fulcrumed to tool-stock at 46 and eccentric 44, and the gage 23, by which the bit 13 is brought against the blank in a firm and positive manner and prevented from taking too rank a hold.

6. In a machine for making potato-mashers, the bit 15 upon bent lever 30, and curved to an arc concentric with the fulcrums 31 31' of said lever, said fulcrums being on a line which intersects the tool-rest axis vertically, said bit discharging the double function of shaping the butt and severing the completed masher from its stub end, as set forth.

7. In a machine for making potato-mashers, the combination, with the tubular tool-stock 7, having the four slots or orifices 8 9 10 11, of the several consecutively-operated bits 12 13 14 15 for forming the body, the handle, the crown, and the butt of the masher and separating the same from its stub end, as set forth.

WILLIAM C. FREEMAN.

Witnesses:
W. M. WHITE,
I. N. BRYSON, Jr.